(12) United States Patent
Sahin et al.

(10) Patent No.: US 10,102,356 B1
(45) Date of Patent: Oct. 16, 2018

(54) SECURING STORAGE CONTROL PATH AGAINST UNAUTHORIZED ACCESS

(71) Applicant: EMC IP Holding Company LLC, Hopkinton, MA (US)

(72) Inventors: Adnan Sahin, Needham, MA (US); Michael Specht, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 119 days.

(21) Appl. No.: 15/064,829

(22) Filed: Mar. 9, 2016

(51) Int. Cl.
*G06F 17/00* (2006.01)
*G06F 21/31* (2013.01)
*G06F 21/62* (2013.01)

(52) U.S. Cl.
CPC .......... *G06F 21/31* (2013.01); *G06F 21/6218* (2013.01)

(58) Field of Classification Search
CPC ................. H04L 63/083; H04L 9/3226; H04L 2463/102; H04L 63/04; H04L 63/0428; H04L 63/0823; H04L 63/0838; H04L 63/0846; H04L 63/166; H04L 9/3228; H04L 9/3265; H04L 9/3268; H04L 67/1097; H04L 41/0681; H04L 2029/06054; H04L 29/06; H04L 41/12; H04L 41/22; H04L 63/0442; H04L 63/123; H04L 67/1002; H04L 69/329; H04L 9/3247; G06Q 30/06; G06Q 50/16; G06F 2003/0697; G06F 3/0601; G06F 21/57
See application file for complete search history.

(56) References Cited

U.S. PATENT DOCUMENTS

| | | | | |
|---|---|---|---|---|
| 9,729,524 B1 * | 8/2017 | Brandwine | ......... | H04L 63/0457 |
| 2007/0006268 A1 * | 1/2007 | Mandera | ........... | H04L 29/06027 |
| | | | | 709/219 |
| 2011/0244798 A1 * | 10/2011 | Daigle | .................... | H04L 63/08 |
| | | | | 455/41.2 |

OTHER PUBLICATIONS

EMC, "Isolated Recovery Solution," Last Line of Defense Against Cyber Attacks, Redefine Solution Overview, www.emc.com, Aug. 2015.
EMC, "Cyber Attacks the Threat of Data Loss Protect Against Data Loss from Cyber-Attacks," www.emc.com, Aug. 2015.
EMC, "Ransomware, have you heard of it?," Data Cortex, Dec. 21, 2015.

* cited by examiner

*Primary Examiner* — Abiy Getachew
(74) *Attorney, Agent, or Firm* — Muirhead and Saturnelli, LLC

(57) ABSTRACT

Techniques are described providing secure authentication of control commands executed on a data storage system. A pass code may be generated in accordance with criteria in response to successful two-factor authentication of a user identifier. Providing a valid generated passcode may be required with a control command in order for a data storage system to execute the control command. The control command may be one of a subset of possible control command that may be performed with respect to storage entities, such as logical devices and snapshots thereof. In another embodiment, rather than providing a pass code, the two factor authentication information and user identifier may be provided with the control command whereby successful completion of two-factor authentication of the user identifier and two factor authentication information may be required in order to execute the control command.

19 Claims, 9 Drawing Sheets

200

| Policy A | 220 | All control commands modifying any state information of a protected LUN, its snapshot, and any remote replicated copy. |

| Policy B | 240 | Control commands which delete any of: a protected LUN, one of its snapshots, and a remote replicated copy. |

FIG. 4

SECURING STORAGE CONTROL PATH AGAINST UNAUTHORIZED ACCESS

BACKGROUND

Technical Field

This application generally relates to data storage.

Description of Related Art

Systems may include different resources used by one or more host processors. Resources and host processors may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes. The logical disk units may or may not correspond to the actual disk drives. Allowing multiple host systems to access the logical volumes allows the host systems to share data stored therein.

SUMMARY OF THE INVENTION

In accordance with one aspect of the techniques described herein is a method of processing control commands comprising: receiving first information identifying a first portion of one or more control commands for a second portion of one or more data storage entities, wherein each of the control commands in the first portion is an allowable control command for each of the data storage entities of the second portion; providing a user identifier and authentication information to a pass code provider; authenticating the user identifier using the authentication information; in response to successfully completing said authenticating, generating a pass code in accordance with one or more criteria; sending a request to a data storage system over a control path, the request including the pass code and a control command of the first portion; performing first processing on the data storage system that validates the pass code for use with the control command; and responsive to successfully validating the pass code, executing the control command. The first portion may identify a subset of allowable control commands. The second portion may identify a subset of one or more data storage entities defined in a data storage system configuration. The second portion may identify a subset of defined logical devices and associated snapshots, and the first portion may identify one or more control commands issued to modify a state associated with any logical device or any snapshot of the second portion. The second portion may identify a subset of defined logical devices and associated snapshots, and the first portion may identify one or more control commands issued to delete any logical device or any snapshot of the second portion. The method may include defining one or more policies each identifying a first subset of control commands; defining a second subset of data storage system entities; and associating the second subset of data storage system entities with a first of the one or more policies, wherein said associating indicates that each control command identified in said first policy requires a valid pass code to be provided in order for said each control command to be executed by the data storage system. The one or more criteria may include any one or more of: an identifier or serial number of the data storage system, a logical device identifier, a snapshot identifier, a string denoting a date and time, and a network location of the data storage system. The first processing performed by the data storage system that validates the pass code may comprise: determining a computed pass code in accordance with the one or more criteria; comparing the computed pass code to the pass code received over the control path in the request; if the computed pass code matches the pass code received, determining that the pass code received has been successfully validated; and if the computed pass code does not match the pass code received, determining that the pass code received has not been successfully validated. The authentication information may be two-factor authentication information and the authentication may perform two-factor authentication processing to authenticate the user identifier. The two-factor authentication information may include a user password and a random number generated as part of a random number sequence having a seed value associated with the user identifier. A hardware token or fob may generate random numbers of the random number sequence at various points in time and may display each of the generated random numbers on the hardware token or fob at a different one of the various points in time. The hardware token or fob may generate a new random number at each occurrence of a fixed time interval. The pass code may be valid for any of: performing a specified number of control commands of the first portion, performing any number of control commands of the first portion in a defined time period, and performing any number of control commands before a defined expiration time. The pass code may be a hash value generated using a cryptographic hash function having one or more inputs determined in accordance with the one or more criteria.

In accordance with another aspect of techniques herein is a computer readable medium comprising code stored thereon that, when executed, performs a method of processing control commands comprising: receiving first information identifying a first portion of one or more control commands for a second portion of one or more data storage entities, wherein each of the control commands in the first portion is an allowable control command for each of the data storage entities of the second portion; sending a request to a data storage system over a control path, the request including a user identifier, two-factor authentication information, and a control command of the first portion; responsive to receiving the request, performing two-factor authentication on the data storage system to authenticate the user identifier using the two-factor authentication information; and responsive to successfully authenticating the user identifier using the two-factor authentication information, executing the control command, and otherwise not executing the control command. The two-factor authentication information may include a user password and a random number generated as part of a random number sequence having a seed value associated with the user identifier.

In accordance with another aspect of techniques herein is a system comprising: a processor; and a memory comprising code stored thereon that, when executed, performs a method of processing control commands comprising: receiving first information identifying a first portion of one or more control commands for a second portion of one or more data storage entities, wherein each of the control commands in the first portion is an allowable control command for each of the data storage entities of the second portion; providing a user identifier and authentication information to a pass code provider; authenticating the user identifier using the authentication information; in response to successfully completing said authenticating, generating a pass code in accordance with one or more criteria; sending a request to a data storage system over a control path, the request including the pass code and a control command of the first portion; performing first processing on the data storage system that validates the pass code for use with the control command; and responsive to successfully validating the pass code, executing the control command. The first portion may identify a subset of allowable control commands. The second portion may identify a subset of one or more data storage entities defined in a data storage system configuration. The second portion may identify a subset of defined logical devices and associated snapshots, and the first portion may identify one or more control commands issued to modify a state associated with any logical device or any snapshot of the second portion.

BRIEF DESCRIPTION OF THE DRAWINGS

Features and advantages of the present invention will become more apparent from the following detailed description of exemplary embodiments thereof taken in conjunction with the accompanying drawings in which:

FIG. 4 is an example of policies that may be used in an embodiment in accordance with techniques herein.

DETAILED DESCRIPTION OF EMBODIMENT(S)

Figure 1:
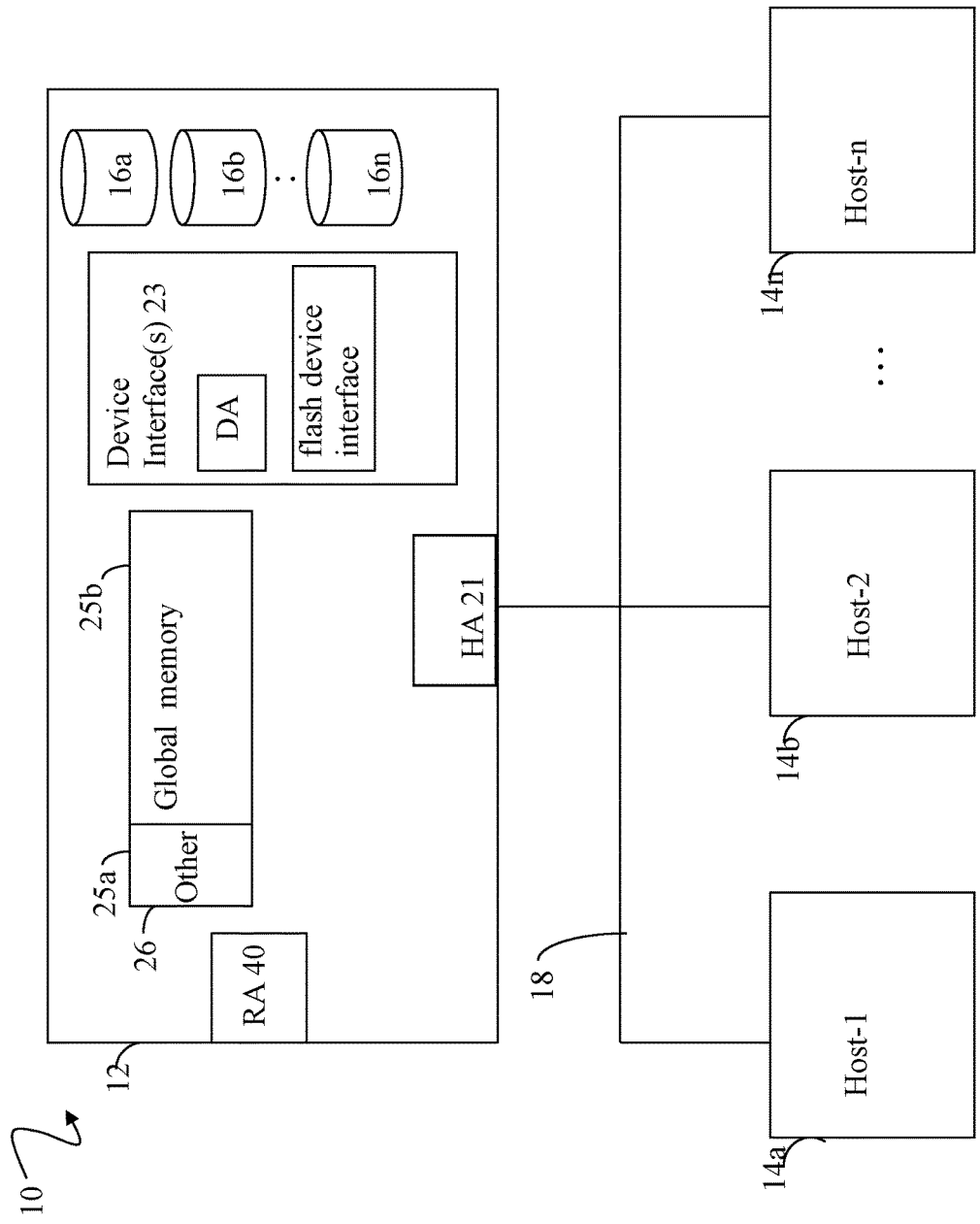
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device. Generally, elements 16a-16n may denote any suitable non-volatile data storage device or medium upon which data may be stored and retrieved.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a rotating disk drive or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices or logical volumes (LVs) which may also be referred to as logical units (e.g., LUNs). The LUNs may or may not correspond to the actual physical devices or drives 16a-16n. For example, one or more LUNs may reside on a single physical drive or multiple drives. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN(s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

The device interface, such as a DA, performs I/O operations on a drive 16a-16n. In the following description, data residing on an LUN may be accessed by the device interface following a data request in connection with I/O operations that other directors originate. Data may be accessed by LUN in which a single device interface manages data requests in connection with the different one or more LUNs that may reside on a drive 16a-16n.

Figure 2:
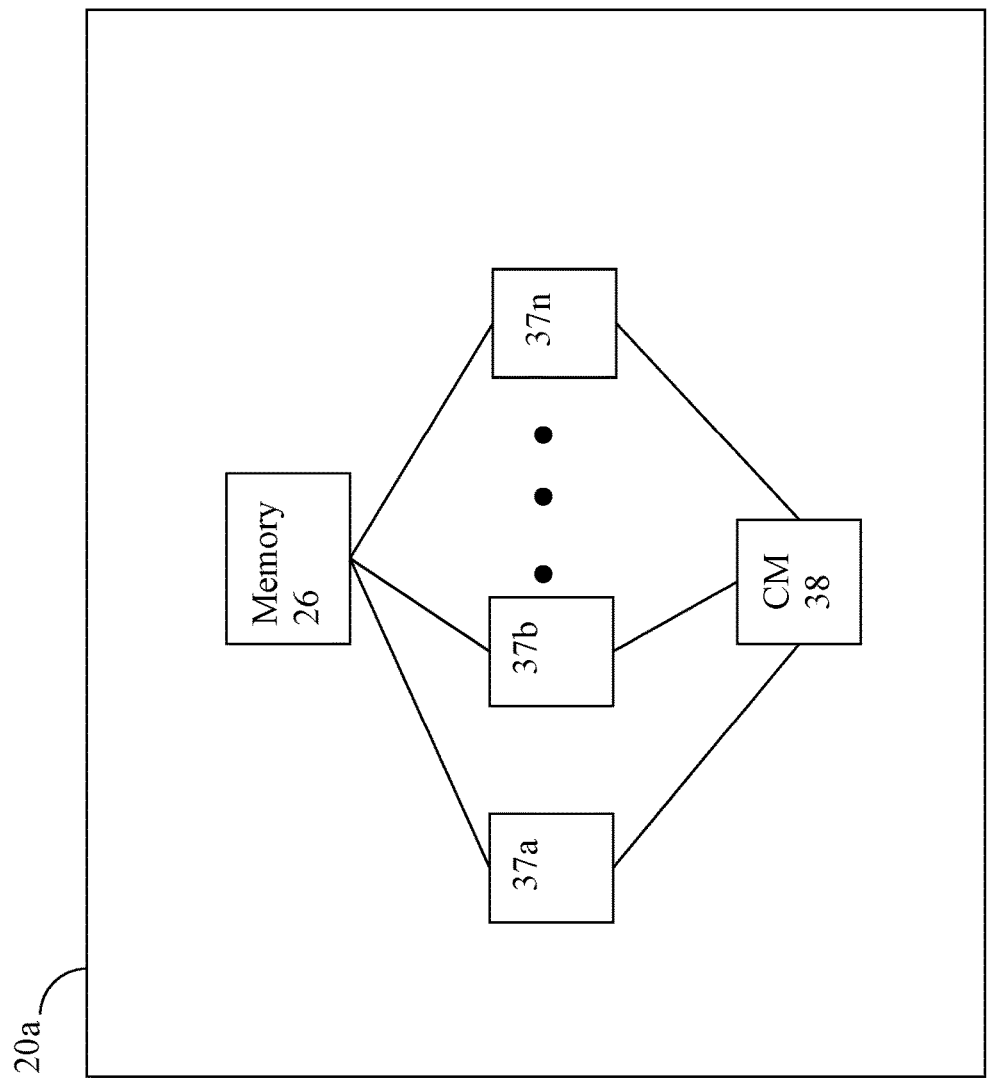
FIG. 2 is a representation of the logical internal communications between the directors and memory included in one embodiment of a data storage system of FIG. 1.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. For example, in connection with a write operation, an embodiment may first store the data in cache included in a portion of GM 25b, mark the cache slot including the write operation data as write pending (WP), and then later destage the WP data from cache to one of the devices 16a-16n. An acknowledgement regarding the write completion may be returned to the host or other client issuing the write operation after the write data has been stored in cache. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host. An I/O operation such as a read or write operation received from a host may be directed to a LUN and a location or offset (e.g., such as a logical block address (LBA)) of the LUN.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a Symmetrix® VMAX® data storage array by EMC Corporation of Hopkinton, Mass. In the foregoing data storage array, the data storage devices 16a-16n may include a combination of rotating disk drives and flash drives. The flash devices may be constructed using nonvolatile semiconductor NAND flash memory. The flash devices may include one or more SLC (single level cell) devices and/or MLC (multi level cell) devices, such as, for example, triple level cell (TLC) devices.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. In at least one embodiment of a data storage system in accordance with techniques herein, the data storage system may include multiple CPU "cores" or processors partitioned to function as the different components, such as DAs, FAs, RAs and the like, and to perform tasks handled by such components. For example, a number of CPU processors or cores may be configured to function as DAs and read data from physical storage and write data to physical storage (e.g., performing back end I/O operations and processing tasks denoting a back end I/O workload). As another example, a number of CPU processors or cores may be configured to function as FAs and receive external I/Os such as from hosts or other clients of the data storage system (e.g. where such processors perform processing and handling of front end I/O operations denoting a front end I/O workload). The various CPU processors or cores may have their own memory used for communication between other CPU processors or cores rather than utilize a global memory accessible to all storage processors. In such embodiments, memory 26 may represent memory of the CPU processors or cores.

With reference back to FIG. 1, illustrated is an RA or remote adapter 40. The RA may be hardware including a processor used to facilitate communication between data storage systems, such as between two of the same or different types of data storage systems. In one embodiment described in more detail in following paragraphs and figures, the RAs of the different data storage systems may communicate over a Gigabit Ethernet or Fibre Channel transmission channel supporting messaging traffic between data storage systems. The RA may be hardware including a processor used to facilitate communication between data storage systems, such as between two Symmetrix® data storage systems. The RA may be used with the Symmetrix® Remote Data Facility (SRDF®) products provided by EMC Corporation of Hopkinton, Mass. SRDF® is a family of products that facilitates the data replication from one Symmetrix® storage array to another through a Storage Area Network (SAN) or and IP network. SRDF® logically pairs a device or a group of devices from each array and replicates data from one to the other synchronously or asynchronously. Generally, the SRDF® products are one example of commercially available products that may be used to provide functionality of a remote data facility (RDF) for use in an embodiment in connection with techniques herein.

One of the hosts, such as host 14a of FIG. 1, may issue a command, such as to write data to a device R1 of data storage system 12. In some instances, it may be desirable to copy data from the storage device R1 to another second storage device, such as an R2 device provided in another remote data storage system at a different location (not illustrated) so that if a disaster occurs that renders R1 inoperable, the host (or another host) may resume operation using the data of R2 of the remote data storage system. Such a capability is provided, for example, by the SRDF® products provided by EMC Corporation of Hopkinton, Mass. Data storage device communication between Symmetrix® data storage systems using SRDF® is described, for example, in U.S. Pat. Nos. 5,742,792, 5,544,347, 7,054,883, and 8,335,899, all of which are incorporated by reference herein in their entirety. With SRDF®, a user may denote a first storage device, such as R1, as a master storage device and a second storage device, such as R2, as a slave storage device. Other incarnations of SRDF® may provide a peer to peer relationship between the local and remote storage devices. In this example, the host 14a interacts directly with the device R1 of data storage system 12, but any data changes made are automatically provided to the R2 device of a remote data storage system (not illustrated) using SRDF®. In operation, the host 14a may read and write data using the R1 volume in the data storage system 12, and SRDF® may handle the automatic copying and updating of data from R1 to R2 in remote data storage system.

An embodiment in accordance with techniques herein may be used with SRDF®, or more generally any RDF, operating in one or more different supported modes. For example, such modes may include SRDF® operating in synchronous mode, asynchronous mode, or adaptive copy mode. For example, in connection with SRDF®, the host may issue a write to an R1 device in a first data storage system and the data change is propagated to the R2 device in a second data storage system. As discussed in U.S. Pat. No. 5,544,347, SRDF® can be operated in either a synchronous mode or an asynchronous mode. When operating in the synchronous mode, the host does not consider an operation specified by a command chain to be completed until the command chain has been committed to both the first (primary) and second (remote) data storage systems. Thus, in synchronous mode, the first or source storage system will not provide an indication to the host that the data operation is complete until the first storage system receives an acknowledgement from the second data storage system regarding the data for the R2 device. In contrast, in connection with the asynchronous mode, the host receives an acknowledgement from the first data storage system as soon as the information is committed to the first data storage system without waiting for an acknowledgement from the second data storage system. With synchronous SRDF®, a host cannot proceed to the next I/O until a synchronous SRDF® I/O has completed.

Current data storage systems may be subject to unauthorized access resulting in loss of access to data as well as loss and/or corruption of the data itself. In connection with data storage systems, such an unauthorized access may be the result of a compromise of the data path and/or the control path. Compromise of the data path and/or control path may result, for example, in an adversary destroying data through unauthorized command issuance, in an adversary encrypting data using an encryption key and technique unknown to the customer and then asking for monetary or other ransom to unencrypt the customer data, and the like.

The data path or I/O path may be characterized as the path or flow of I/O data through a system. For example, the data or I/O path may be the logical flow through hardware and software components or layers in connection with a user (more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. Such commands may be, for example, to establish or modify data services, provision storage, perform user account management, and the like. For example, commands may be issued over the control path to provision storage for LUNs, create a snapshot, delete a snapshot, define or establish local and/or remote replication services, define or modify a schedule for snapshot or other data replication services, define a RAID group, obtain data storage management and configuration information for display in a graphical user interface of a data storage management program or application, generally modify one or more aspects of a data storage system configuration, and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, a data storage system may have a separate physical connection from a management system to the data storage system being managed whereby control commands may be issued over such a physical connection. However, it may be that user I/O commands are never issued over such a physical connection provided solely for purposes of connecting the management system to the data storage system. In any case, the data path and control path each define two separate flow paths.

As an example to further illustrate, consider a snapshot such as may be created and exist with respect to a provisioned storage entity, such as a LUN, file system, and the like. As known in the art, a snapshot may be characterized as a point in time logical image of data. In connection with LUNs, software of a data storage system may provide one or more data replication services or facilities whereby a snapshot is one such facility that may be used to create point in time snapshot of production data for non-disruptive backup. A snapshot may be made with respect to a source LUN thereby providing a point in time image of the source LUN. A snapshot may appear like a normal LUN and may be used for backup, testing, and the like. Snapshots may rely, for example, on copy on first write (COFW) and other techniques to track source LUN changes from the time when a snapshot was created. Any writes to the source LUN may result in processing by snapshot software, for example, to copy the original data prior to changes into another area of storage. With respect to COFW techniques, the COFW occurs only once for each data block modified on the source LUN. Since only changed data blocks of the source LUN are retained rather than make a complete copy of the source LUN, the storage capacity required to implement snapshots may be considerably less than that of the source LUN. Though a LUN snapshot may be presented to a user as a separate LUN along with the current source LUN, a snapshot of a LUN is a virtual point in time copy and requires access to the unchanged data in the source LUN. Therefore failures affecting the source LUN also affect the snapshot of the LUN. Snapshots of a LUN may be contrasted, for example, bit-for-bit replica data copies of a source LUN. Snapshots may be made of a source LUN on demand, according to a schedule, such as daily or at other predefined times, and the like.

In connection with the foregoing, COFW is only one example of technology that may be used in connection with snapshots. More generally, any suitable technique may be used in connection with snapshot creation and techniques described herein. As another example, redirect on Write (ROW) is another technique that may be used in connection with a snapshot implementation, such as in connection with EMC®VNX™ Snapshots. With ROW, after a snapshot is taken, new writes to the primary LUN are redirected (written) to a new location within a storage pool.

In a case where only the data path is compromised in connection with a system having LUNs and snapshots thereof such as mentioned above, malicious commands may be issued over the compromised data path causing data corruption of the source LUN and/or its snapshot LUN. For example, the data path may be compromised whereby malicious I/O commands are issued to the source LUN and/or its snapshot such as to overwrite existing valid customer data with bad, corrupt or invalid data. Once discovered, data recovery to an earlier point in time copy of the source LUN may be possible such as by restoring the source LUN to an earlier snapshot of the LUN.

In a case where the control path is compromised, management commands may be issued resulting in possibly more invasive data loss. For example, the control path may be used to issue commands that delete the source LUN and/or its snapshots, encrypt the source LUN using an encryption technique unknown to the user so that snapshots cannot therefore be used, and the like. In such a case where the source LUN is deleted or otherwise encrypted using an unknown encryption technique, it may not be possible to recover the source LUN to an earlier point in time copy unless there is also a bit for bit replica of the source LUN available (which may be made less frequently than LUN snapshots).

One brute force solution is to create a complete copy of the LUN or other data to be protected in another second data storage system that is completely isolated from remaining portions of an infrastructure. The second system may allow access only for data replication purposes after which isolation is then reestablished. Furthermore, any updates to the second system (such as to provide user data updates) would only be allowed after verification processing and validation of any data updates received. The foregoing brute force solution requires a separate remote system which is expensive and requires isolation of both the control and data paths from remaining portions of an infrastructure (other than for data replication as noted above). Such isolation may be difficult to police and enforce.

Thus, there is a need and desire to provide solutions protecting against such compromises and unauthorized accesses. Described in following paragraphs are techniques that may be used in connection with providing protection against compromises and unauthorized access via the control path. Such techniques described in connection with providing a more secure control path may be characterized as more efficient, flexible and less costly, for example, than the brute force solution noted above.

In at least one embodiment in accordance with techniques herein, two-factor authentication may be selectively applied for use in connection with the control path with respect to commands for specified logical devices or more generally, selected data storage entities defined in a configuration. Additionally, such techniques may be selectively applied for use with particular operations or commands. In this manner, techniques herein provide flexibility by allowing customization, such as by a data storage manager or administrator, who can identify a set of logical devices or LUNs and/or identify particular commands or operations to which such techniques are to be applied.

Two-factor authentication may be characterized as providing identification of users by means of a combination of two different items or factors of information. These items or factors of information may be something that the user knows, something that the user possesses, or something that is inseparable from the user. The use of two-factor authentication to prove one's identity is based on the premise that an unauthorized actor is unlikely to be able to supply both factors required for access. If, in an authentication attempt, at least one of the components is missing or supplied incorrectly, the user's identity is not established with sufficient certainty and access to the asset (e.g., a building, or data) being protected by two-factor authentication then remains blocked. The authentication factors of a two-factor authentication scheme may include, for example, some physical object in the possession of the user (e.g., such as a USB or flash memory stick with a secret token, a bank card, a key, and the like), a secret known to the user (e.g., such as a username, password, PIN, and the like), or some physical characteristic of the user (e.g., biometrics), such as a fingerprint, eye iris print, and the like.

For example, RSA SecurID® by EMC Corporation provides a two-factor authentication including a first factor that is a password, such as a user-specified secret or password, and a second factor that is a number generated by a token, such as a hardware component, token or "fob" where a new number is generated by the token at each occurrence of a fixed time interval. For example, the token may be the hardware component that generates and displays a new random number every 60 seconds. The hardware component or "fob" may be assigned to a particular user such as having a particular user identifier. The hardware component may generate each new random number using a built-in clock and the hardware component or fob's factory-encoded random key (known as the "seed" for generating the random number stream or sequence). The seed is different for each hardware component or fob (and thus associated user identifier and associated user password) and may be loaded into the corresponding server or authentication management software performing the authentication of the user. In operation, the authentication management software may include information which associates a particular seed with a particular user identifier and user specified password prior to use with authentication. Both the hardware component or "fob" and the authentication management software may perform the same algorithm to generate the next random number in the stream based on the known seed. As described below, the authentication management software may then authenticate a user by comparing a user entered password and user entered random number with, respectively, an excepted password and computed random number.

Generally, in one embodiment in accordance with techniques herein, the two-factor authentication may be used in connection with selective control commands issued over the control path to selected LUNs or other storage entities. An example of one embodiment in accordance with techniques is described in more detail below with reference to the example 100 of FIG. 3. In the following example, it is presumed for purposes of illustration that the two-factor authentication technique is RSA SecurID® by EMC Corporation. More generally, techniques herein may be used with any two-factor, multi-factor, or other suitable authentication technique.

Figure 3:
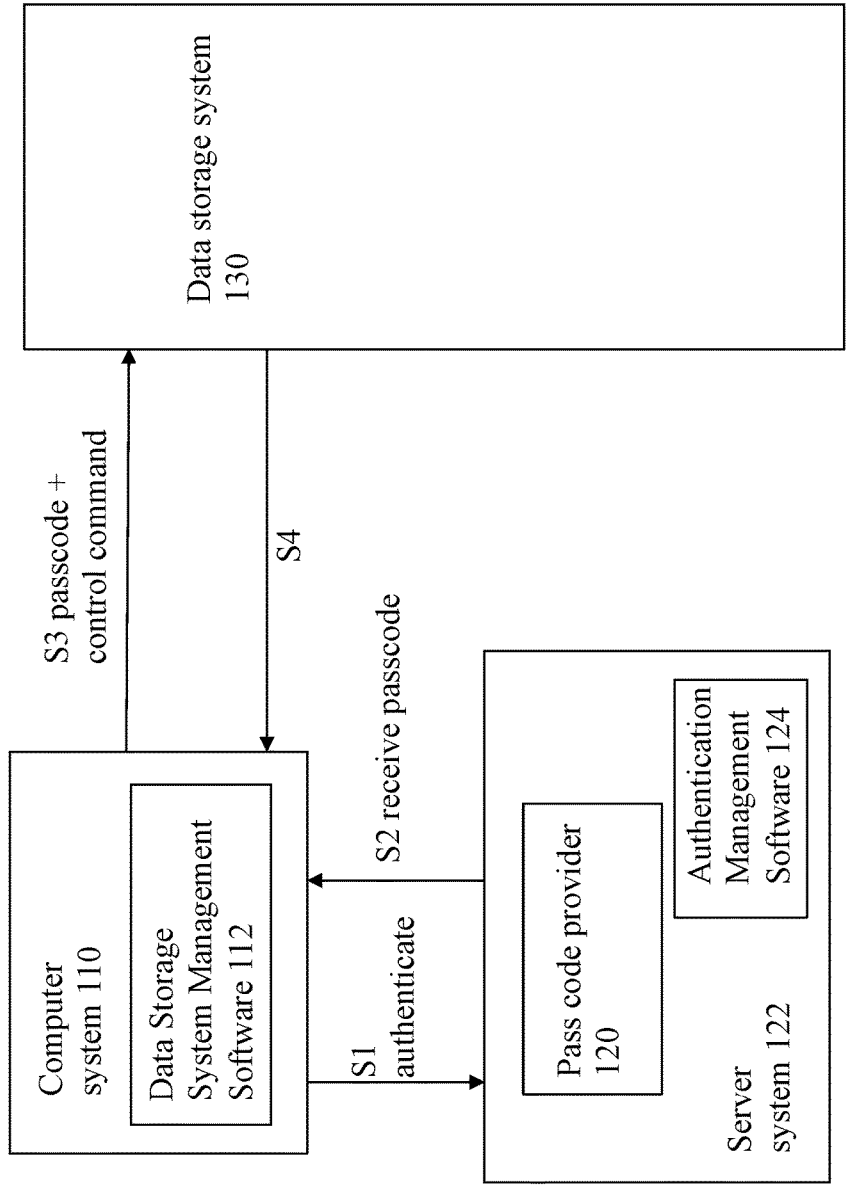
FIGS. 3 and 5 are examples of components that may be include in embodiments in accordance with techniques herein.

In FIG. 3, illustrated is a user computer system 110, a server system 122 and a data storage system 130. The server system 122 may include pass code provider 120 and authentication management software 124. Each of the user computer system 110 and server system 122 may generally be any commercially available or proprietary system that includes one or more processors, memory, and the like. In one embodiment, the user computer system 110 may include a web browser or other software having a suitable interface and which is able to communicate with other components in connection with performing techniques herein. The data storage system 130 may be as described elsewhere herein, such as in connection with FIGS. 1 and 2. The pass code provider 120 may be a component, such as implemented in software or more generally by executing code, that generates a pass code provided to a user for use in connection with subsequently issued control commands to the data storage system 130. In at least one embodiment, the pass code provider 120 may be a web service to which the user is able to connection using a standard web browser and/or other software (such as management software 112 described below) of the user computer system 110.

As a first step S1, a user on the user computer system 110 may connect to the pass code provider 120 using the two-factor authentication. The user may provide authentication information including a user identifier, a user-specified password, and the random number as provided, for example, on the hardware token.

A user authenticating to a network resource, such as the pass code provider 120, enters the user identifier along with both the user specified password and the number currently being displayed at that moment on their RSA SecurID® token. In connection with step S1, the user may connect to the pass code provider 120 executing on a server system 122 which also has a real-time clock and a database of valid hardware tokens and associated seed records as may be managed by the authentication management software 124. The authentication management software 124 may be used in authenticating the user and information provided in S1 whereby the authentication management software 124 may receive the user provided authentication data which includes the user identifier, the user specified password and the random number currently displayed on the user hardware token. The authentication manager software 124 may identify an associated seed for the particular user identifier. The authentication management software 124 authenticates a user by computing what number the token is supposed to be showing at that moment in time on the user's hardware token (e.g., determines the current random number of the random number sequence or stream starting from the user's associated seed value based on the fixed time interval of, for example, every 60 seconds) and checking this computed number against the random number the user entered. Additionally, the authentication management software 124 compares the user entered password with the expected password for the particular user. Authentication is successful if both the user entered password and user entered random number match, respectively, the expected password and the computed number.

If authentication of the user is successful, the pass code provider 120 returns to the user in a step S2 a generated pass code that may then be provided by the user in connection with subsequently issued control commands in step S3 to the data storage system 130. In step S4, for each control command issued, a response may be returned to the system 110 from the data storage system 130.

In this example, assume that the systems have been configured prior to use herein to selectively require use of the pass code generated by the pass code provider 120 in connection with control commands that modify or change the current state of a defined set of LUNs. An embodiment may configure the systems for use with techniques herein in one or more aspects. As a first aspect, the set of LUNs may be selectively specified rather than, for example, include all LUNs. The particular control commands or operations for which the pass code is required may also be selectively specified, for example, rather than apply to all control commands. For example, processing may be performed to require use of the pass code for any/all control commands that perform a modification or change operation with respect to state for the defined set of LUNs.

In at least one embodiment, the pass code provider 120 may generate a pass code in accordance with one or more criteria that may include, for example, any of a serial number of the data storage system 130 (as used by the user or customer that will be issuing control commands to the particular customer data storage system 130), a LUN identifier, a snapshot name or identifier, date and/or time information (e.g., string denoting a predetermined date and time of day such as the current date and time), information denoting the customer site or location (e.g., web address or internet/network location such as of the computer system 110, or data storage system 130), and the like.

It should be noted that the particular one or more criteria used to generate the pass code may vary with the particular user for which authentication is performed and may also vary with additional information. The additional information may be provided, for example, in step S1 by the user as part of the authentication process or may otherwise be part of a current configuration set for use with control commands. For example, the user may also provide additional information to the pass code provider 120 in step S1 which may identify the particular LUN or defined set of LUNs for which the user is going to subsequently issue control commands in step S3. Alternatively, configuration options may be currently set to indicate that control commands are to be used in connection with a particular LUN or a defined set of LUNs and the additional information may alternatively be obtained from the configuration settings. In this instance, the pass code provider 120 may generate a customized pass code for issuing control commands to the particular LUN or particular defined set of LUNs by using one or more attributes of the particular LUN or particular defined set of LUNs in computing the pass code. For example, assume the defined set of LUNs includes LUN A and LUN B and the user provides information to the pass code provider 120 in step S1 to generate a pass code for use in connection with issuing control commands to only LUN A. In this case, the pass code provider 120 may use criteria including one or more attributes of LUN A (e.g., LUN A identifier, name or identifier of a snapshot of LUN A) possibly along with other criteria (e.g., serial number or identifier of the data storage system 130) when generating the pass code returned to the user in step S2. In such an embodiment, the pass code generated may only be used in connection with issuing subsequent control commands that operate on LUN A. A different pass code may be similarly generated for use with control commands issued to LUN B by identifying LUN B in step S1 as the particular LUN for which control commands are being generated. As yet another alternative, the user may identify in step S1 that the pass code is being generated for use with control commands for LUN A and LUN B whereby the pass code provider 120 may use criteria including one or more attributes of both LUN A in combination with LUN B (e.g., identifiers for both LUN A and LUN B, name or identifier of a snapshot of LUN A and also a name or identifier of a snapshot of LUN B) possibly along with other criteria (e.g., serial number or identifier of the data storage system 130) when generating the pass code returned to the user in step S2.

It should be noted that an embodiment may also allow a user or data storage administrator to configure the pass code provider 120 to selectively use one or more criteria in generating pass codes. For example, a user may select to use criteria including a first LUN identifier and a first snapshot identifier when generating a pass code that is considered valid by the data storage system for use in connection with control commands performed with respect to the particular LUN having the first LUN identifier and its snapshot having the first snapshot identifier.

As a variation, the user may select to use criteria including only the data storage system serial number of identifier when generating a pass code to be used in connection with executing any control command on the particular data storage system having the specified serial number.

Generally, as described elsewhere in more detail, whatever one or more criteria and algorithm are used by the pass code provider 120 in generating the pass code provided in steps S2 and S3, the same one or more criteria and algorithm need to be used by the data storage system 130 in determining the computed pass code which is compared to the provided pass code in S3.

As noted above, in step S2, the generated pass code may be returned to the user on the computer system 110. At a later point in time, a control command may be issued in step S3 to the data storage system 130. The information communicated in step S3 may include the pass code as returned previously in step S2. The data storage system 130 may perform processing to determine whether to execute the control command. Such processing may include the data storage system 130 generating a computed pass code using the same algorithm and criteria used by the pass code provider 120, comparing the computed pass code with the pass code provided with the control command in step S3, and determining whether the computed pass code matches the user provided pass code specified with control command in S3. If the computed pass code matches the user provided pass code, the control command is executed and a response is returned in step S4 to the computer system 110. The response may reflect the result of executing the requested control command. If the computed pass code does not match the user provided pass code, the control command is not executed and a response is returned in step S4 to the computer system 110. The response may reflect an error or other condition denoting the decision to not execute the requested control command. Thus, as noted above, whatever one or more criteria and algorithm are used by the pass code provider 120 in generating the pass code provided in steps S2 and S3, the same one or more criteria and algorithm needs to be used by the data storage system 130 in determining the computed pass code which is compared to the provided pass code in S3. Such one or more criteria may be known or otherwise provided to the data storage system 130 in any suitable manner. For example, the particular criteria used in generating a pass code may be implied or predetermined. The particular criteria may be implied, for example, based on the particular control commands, data storage system attribute(s) and the like. The particular criteria used in generating pass codes may be communicated to the data storage system, for example, as particular configuration settings that may be modified from time to time using the data storage system management software 112 as discussed elsewhere herein. The particular criteria used in generating a particular pass code may be included in the information communicated in step S3. For example, the particular criteria sent in S3 that was used in generating the pass code also included in S3 may be transmitted in an encoded or encrypted form using any suitable encryption or encoding understood by the sender, computer system 110, and receiver, data storage system 130.

In at least one embodiment, the user computer system 110 may include data storage system management software 112 executing thereon. The management software 112 may be used to perform data storage system management operations some examples of which are provided elsewhere herein. The management software 110 may have a user interface, such as a graphical user interface, command line interface, and the like, through which a data storage manager or administrator may perform data storage management operations, such as in connection with issuing the control commands in step S3 to the data storage system 130. Additionally, in at least one embodiment, the user may connect and communicate with the pass code provider 120 in step S1 using the management software 124. In such an embodiment, a user may also be required to successfully complete login or other authentication to the management software 124.

Prior to performing the processing beginning with step S1, as noted above, an embodiment may use the data storage management software 112 to configure options for use with techniques herein. Such configuration information may also be communicated to the data storage system 130 by the management software 112. For example, a subset of existing LUNs or other storage entities may be configured using the management software 112 to identify the subset of LUNs for which the additional passcode is required in order for the data storage system 130 to execution control commands on the defined subset. Additionally, as also noted above, the particular control commands for which the additional passcode is required for execution may also be specified as part of data storage management configuration using the management software 112. For example, the management software 112 may be used to specify, for the specified subset of LUNs, what control commands require the pass code in order to for the data storage system 130 to execute the specified control commands. To further illustrate, an embodiment may specify that, for a subset of one or more LUNs for which snapshots are allowable, all control commands which modify the state of a LUN in the subset or otherwise modify state with respect to a snapshot of such a LUN require the passcode in order for the data storage system 130 to execute the control command. In this example, the one or more LUNs in the subset may denote a protected LUN for which snapshots are enabled and may be created, for example, in accordance with a defined schedule, on demand, in response to an occurrence of defined events, and the like. Control commands which modify the state of a LUN in the subset or any snapshot of such a LUN in the subset may include, for example, modifying or setting any attribute of the LUN or its snapshot (e.g., is encryption of the data performed or enabled), deleting the LUN or any snapshot thereof, creating a snapshot of the LUN, setting an expiration date for a snapshot of the LUN, performing any of mounting or unmounting the LUN or any snapshot thereof (e.g. mounting provides for making the mounted LUN or snapshot visible and accessible to a host or client such as for reads and writes), modifying or creating/establishing aspects related to data protection of the LUN such as defining or modifying a snapshot protection schedule for the LUN (e.g., where the schedule may indicate when and/or how often a snapshot of the LUN is created), modifying or creating/establishing aspects related to remote replication performed for a LUN (e.g., defining or modifying a remote replication schedule affecting when and/or how frequently remote replication using a RDF is performed for a LUN, modifying attributes of remote replication such as changing remote replication modes from synchronous to asynchronous remote replication, or vice versa), and the like.

As a variation and generalization to the particular embodiment of FIG. 3 and other embodiments described herein, it should be noted that, rather than be included in the computer system 110, the data storage management software 112 may generally be located and execute on any one or more servers or systems. For example, the data storage management software 112 may be located and execute on the data storage system 130. In such an embodiment, the user may connect, such as via a web browser, to the software 112 on the data storage system 130. The user may communicate the passcode and control command in step S3 to the software 112 on the data storage system 130. Additionally, in such an embodiment, the user on the computer 110 may communicate with the server system 122 in step S1 using the web browser on the system 110.

Reference is made to the example 200 of FIG. 4 where an embodiment may define different policies identifying different or varying levels of control commands for which the pass code is required to execute the identified control commands. In the example 200, two different policies 220 and 230 may be defined each of which defines a different subset of control commands for which the pass code is also provided in order for the data storage system to execute the control commands. Policy 220 illustrates a first policy, Policy A, that may be defined indicating that any/all control commands that modify any state information with respect to data protection of a LUN may require providing a valid pass code to the data storage system 130 in order for the system 130 to execute the requested control command. An embodiment may also define policy 240, Policy B, that further limits the particular control commands (as compared to policy A) requiring the pass code for execution to include only those which delete or destroy the LUN, delete or destroy one of its snapshots, delete or destroy a remote replication copy of a LUN, and the like.

An embodiment may have define one or more policies such as illustrated in the example 200 where a LUN or a set of one or more LUNs may be associated with one such defined policy to specify the particular control commands that require a pass code for execution of the identified control commands on the associated LUN or set of one or more LUNs. For example, a set of LUNs including LUN X and LUN Y may be defined and associated with Policy A at a first point in time. At a later second point in time, it may be decided that Policy A is excessive for the particular data stored on LUN X and LUN Y and that the additional level of security with a generated pass code is not needed for use with all such designated control commands of Policy A. At this second point in time, the set of LUNs including LUN X and LUN Y may be associated with Policy B 240 rather than Policy A 220, whereby the control commands requiring the pass code for execution on the data storage system is now reduced.

With reference back to FIG. 3, the generated pass code may be valid for issuing a specified number of N commands, N generally being an integer greater than 1. N may be configurable. As a variation, the generated pass code may have an associated expiration date and time whereby the pass code may be considered valid and used in connection with authorizing execution of control commands for a defined time period. In this case, the criteria used to generate the passcode may include a date/time string denoting a starting date and time from which the generated pass code is valid for a predetermined amount of time, such as 1 hour, 1 day, and the like. As a further variation, a user logging into the pass code provider 120 may result in generation of a set of 1 or more passcodes where all passcodes in the set may be valid for a defined time period or otherwise have an associated expiration date and time.

Generally, each of the pass codes generated by the pass code provider 120 may be a hash value determined using a hash function and one or more criteria as noted above. Although generally any suitable hash function may be used, such as any cryptographic hash function, in at least one embodiment, the hash function may be a cryptographic hash function such as a SHA-2 (Secure Hash Algorithm 2) cryptographic hash function known in the art which may take as an input a string of any arbitrary and suitable length and generates a hash value (HV). Generally, a cryptographic hash function is a hash function which is considered practically impossible to invert, that is, to recreate the input data from its hash value alone. Thus, a cryptographic hash function may be characterized as a one-way hash function in which input data may be used to determine a hash value but, given the hash value, its corresponding input data may not be capable of being determined, or may otherwise not practically be determined. In particular, an embodiment in accordance with techniques herein may use a SHA-2 cryptographic hash function that generates a 256 bit HV that may be used as the pass code provided in step S2 and in step S3 for execution of particular control commands. In connection with determining a 256 bit HV using a SHA-2 cryptographic hash function, the hash key input to the hashing function may be a concatenated string of characters, such as a concatenated string of one or more inputs determined in accordance with the one or more criteria that may be used in a particular embodiment. The concatenated character string may be input to the hashing function which is then used to determine the 256 bit HV used as the pass code provided in connection with execution of specified control commands. Consistent with discussion elsewhere herein, the one or more criteria used to compute the pass code, such as an HV, is predetermined using a particular algorithm, such as a particular cryptographic hashing algorithm. In this manner, both the pass code provider 120 and the data storage system 130 may perform the same processing using the same hash function inputs whereby a pass code generated by the pass code provider 120 and provided with a control command may be compared to a computed pass code generated using the same algorithm and criteria on the data storage system. If the computed pass code (computed on the data storage system) matches the pass code provided with a control command (as generated by the pass code provider), then the control command is allowed to be executed on the data storage system. Otherwise, if the foregoing two pass codes do not match, the control command is not executed on the data storage system.

Figure 5:
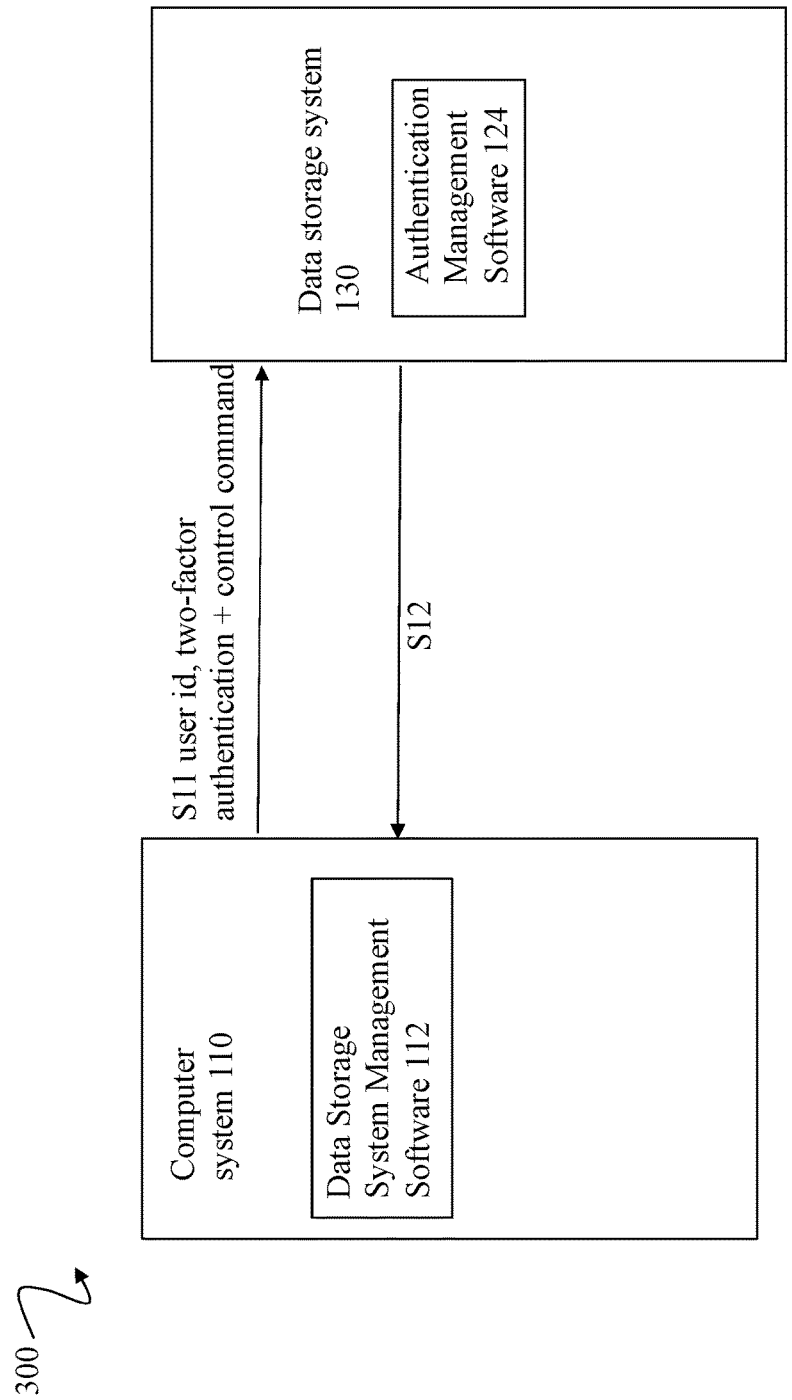

Referring to FIG. 5, shown is another embodiment of a system in accordance with techniques herein. The example 300 includes a user computer system 110, data storage system 130, data storage system management software 112 and authentication management software 124 as described previously in connection with FIG. 3. However, in this example 300, shown is a simplified approach in comparison to the embodiment illustrated in FIG. 3. In the example 300, the two-factor authentication information may be provided by the user along with the control command in a step S11 to the data storage system 130. As described above, a user may log in to the data storage system management software 112 and communicate with the data storage system 130 by providing in step S11 the user identifier and the two-factor authentication information along with the control command to be executed. The user identifier and two-factor authentication information (user password and current random number) provided in step S11 are similar to the information provided in step S1 of FIG. 3. In response to receiving the user identifier and two-factor authentication information of S11, the authentication management software 124 (which is now located on the data storage system 130) may perform processing as described elsewhere herein to determine whether the provided two-factor authentication information—including the user password and current generated random number on the hardware component or fob—matches expected information (e.g., whether the user password and random number provided in S11 matches, respectively, an expected user password and a computed random number). If the foregoing received information matches expected information, the data storage system 130 executes the control command. Otherwise, if no match, the control command of S11 is not executed. In step S12, a response may be returned from the data storage system 130 to the computer system 110 in a manner similar to the response returned in step S4 of FIG. 3 (e.g., indicating either a status as a result of executing the control command or otherwise indicating that the command was not executed).

In such an embodiment as illustrated in FIG. 5, a different hardware component or token may be used for each different physical data storage system to which control commands may be issued.

What will now be described are flowcharts summarizing processing generally described above.

Figure 6:
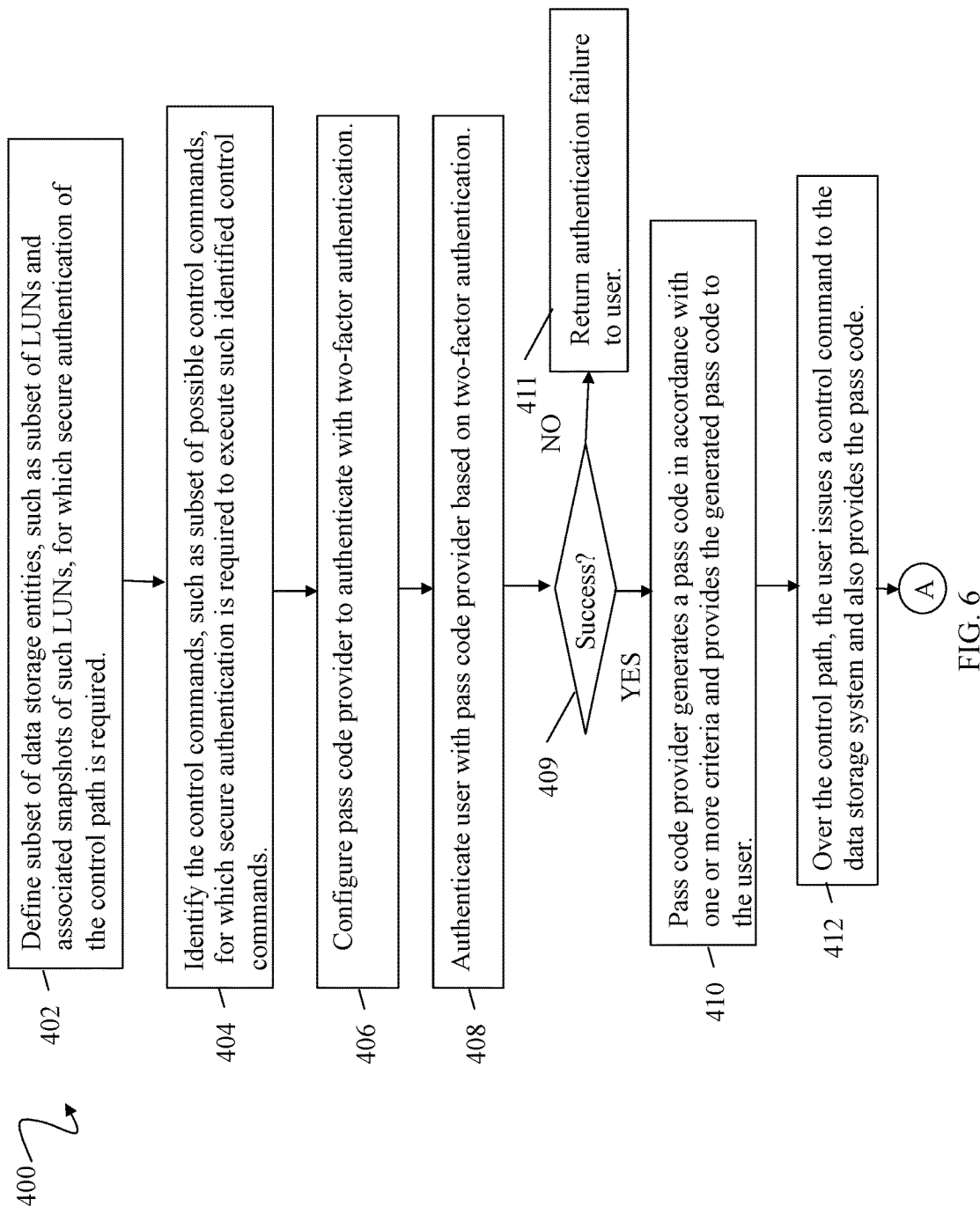
FIGS. 6, 7, 8 and 9 are flowcharts of processing steps that may be performed in embodiments in accordance with techniques herein.
Figure 7:
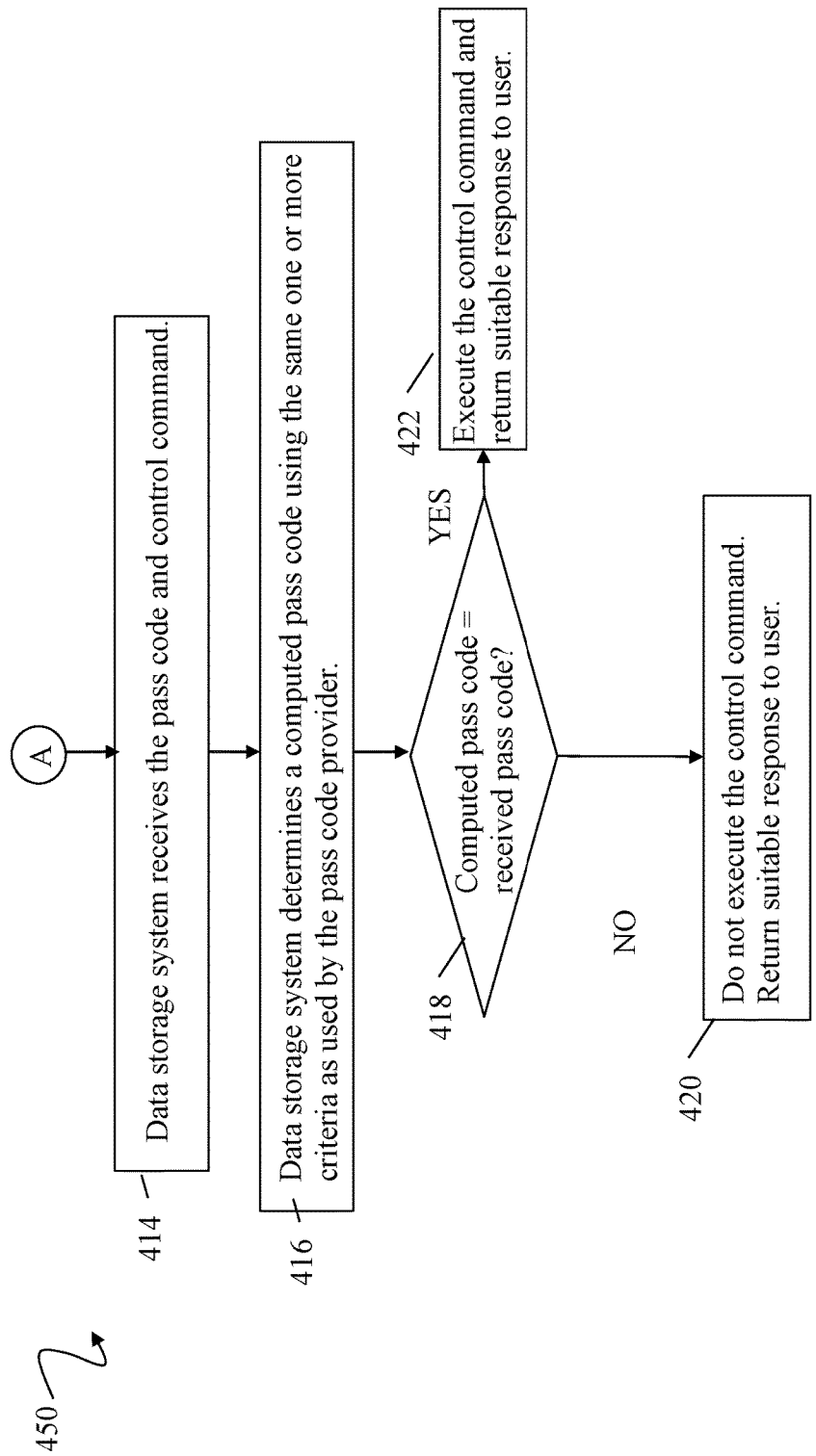

Referring to FIGS. 6 and 7, shown are first flowcharts 400, 450 of processing steps that may be performed in an embodiment in accordance with techniques herein. The steps of FIGS. 6 and 7 generally summarize processing as may be performed in connection with an embodiment such as FIG. 3 noted above. At step 402, a subset of data storage entities, such as a subset of defined LUNs and associated snapshots of such LUNs, for which secure authentication of the control path is required for execution of control commands. At step 404, the control commands are identified, such as a subset of possible control commands, for which secure authentication is required to execute such identified control commands. In one embodiment, steps 402 and 404 may result in identifying a set of one or more LUNs and associated snapshots for which control commands which modify any state information related to the LUNs or associated snapshot require secure authentication of the control path using techniques herein. As such, the affected control commands specified as a result of steps 402 and 404 require a pass code to also be provided to the data storage system in order for any such control command to be executed by the data storage system. In step 406, the pass code provider is configured to require two-factor authentication of a user requesting a pass code. As described elsewhere herein, step 406 may include configuring a particular hardware token or fob having an associated seed used to generate the random numbers displayed on the hardware token or fob assigned to the user. Thus, steps, 402, 404 and 406 may be performed at a first point in time to set up the systems and components used in subsequent processing steps in accordance with techniques herein.

At step 408, a user connects to the pass code provider and is authenticated by the pass code provider using two-factor authentication. At step 409, a determination is made as to whether user authentication in step 408 was successful. It step 409 evaluates to no, control proceeds to step 411 to return an authentication failure message to the user. If step 409 evaluates to yes, control proceeds to step 410 where the pass code provider generates a pass code in accordance with one or more criteria and provides the generated pass code to the user. At step 412, over the control path, the user issues a control command to the data storage system and also provides the pass code. The control command in step 412 may be one of the control commands in the subset of control commands defined via steps 402 and 404 that requires a valid pass code in order for the data storage system to execute the control commands. At step 414, the data storage system receives the pass code and control command. In step 416, the data storage system determines a computed pass code for the control command received using the same algorithm and one or more criteria used by the pass code provider in generating the pass code in step 410. In step 418, a determination is made as to whether the computed pass code matches the received pass code in step 414. If step 418 evaluates to yes, control proceeds to step 422 to execute the control command and return a suitable response to the user. If step 418 evaluates to no, control proceeds to step 420 where the control command is not executed and a suitable response is returned to the user.

It should be noted that processing performed on the data storage system such as in connection with steps 416 and 418 may also generally be referred to as validating the received pass code for use in connection with executing the control command also provided to the data storage system in step 414.

Figure 8:
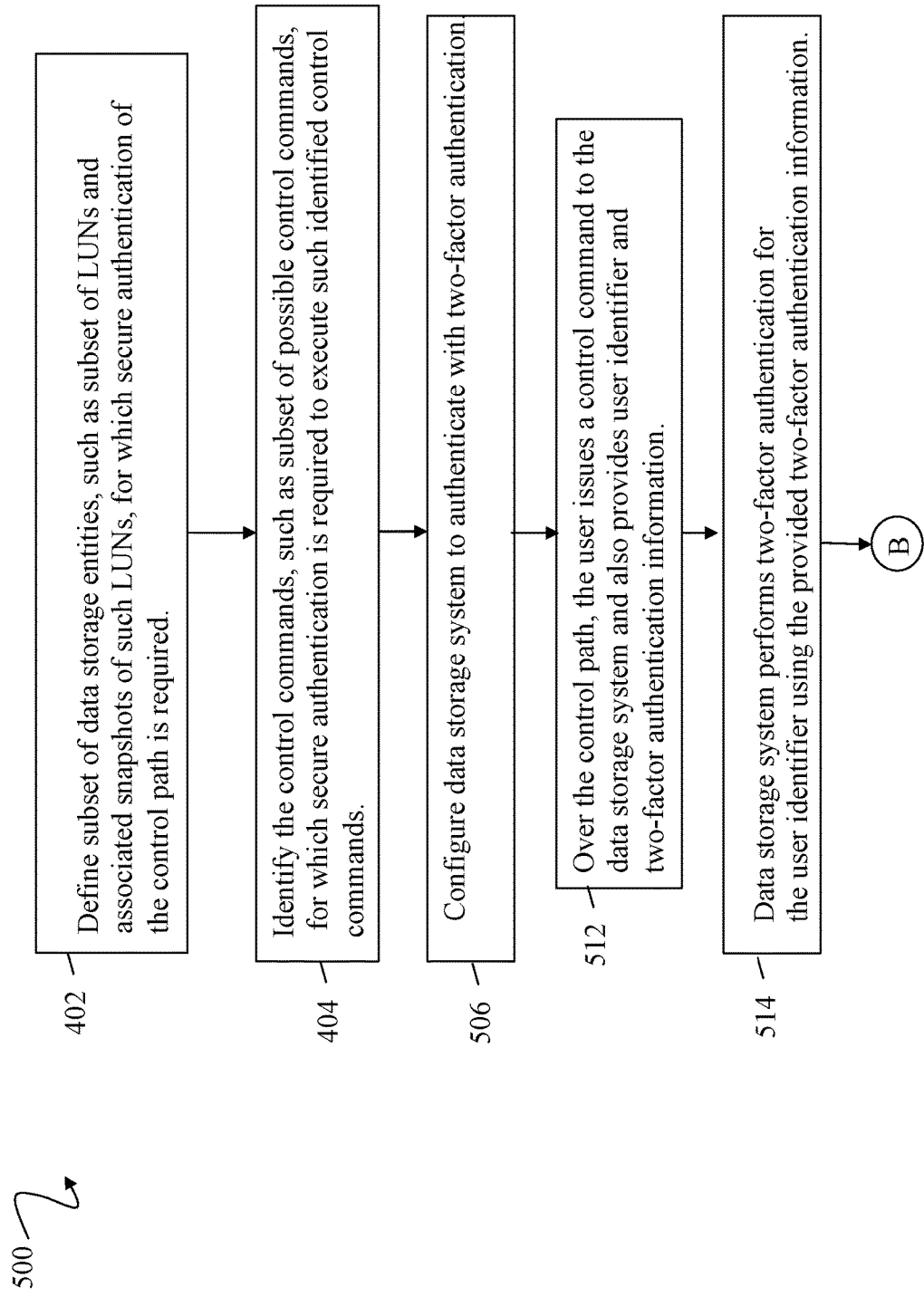
Figure 9:
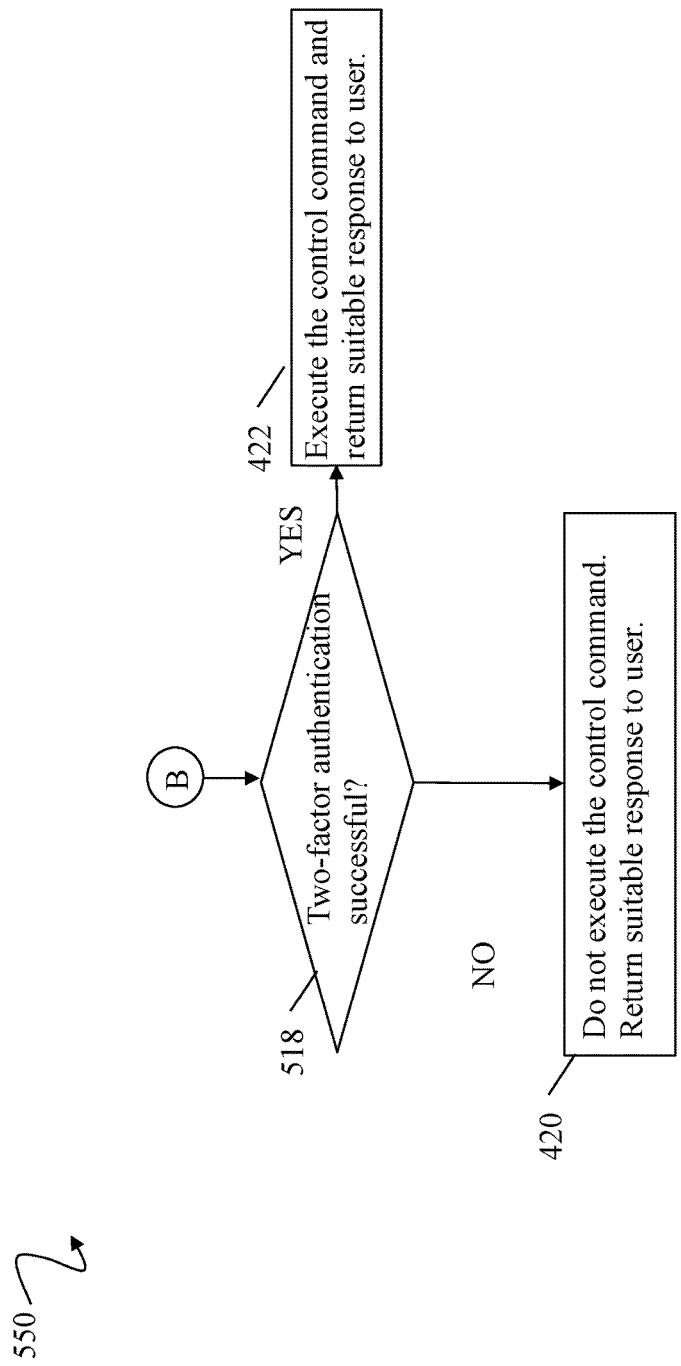

Referring to FIGS. 8 and 9, shown are second flowcharts 500, 550 of processing steps that may be performed in another embodiment in accordance with techniques herein. The steps of FIGS. 8 and 9 generally summarize processing as may be performed in connection with an embodiment such as FIG. 5 noted above. The flowchart 500 includes steps 402 and 404 as described above in connection with FIG. 8 processing. After step 404, step 506 may be performed where the data storage system is configured to authenticate a user identifier and two-factor authentication information provided with a control command. At step 512, over the control path, the user issues a control command to the data storage system and also provides the user identifier and two-factor authentication information, such as the user password and current random number displayed on the hardware token or fob as configured in step 506 for the user having a particular user identifier. In step 512, over the control path, the user issues a control command to the data storage system along with the user identifier (as configured in step 506 and associated with the hardware token or fob) and two-factor authentication information (e.g., user password and current number displayed on the hardware token or fob). The control command issued in step 512 may be one of the control commands in the specified subset of command formed as a result of performing steps 402 and 404. In step 514, processing is performed on the data storage system for two-factor authentication of the user identifier and two-factor authentication information provided in step 512. At step 518, a determination is made as to whether the two-factor authentication of step 514 was successful. If step 518 evaluates to yes, control proceeds to step 422 to execute the control command and return a suitable response to the user. If step 518 evaluates to no, control proceeds to step 420 to execute the control command is not executed and a suitable response is returned to the user. Steps 420 and 422 of FIG. 9 are respectively similar to steps 420 and 422 of FIG. 7.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing control commands comprising:
receiving first information identifying a first portion of one or more control commands for a second portion of one or more data storage entities, wherein each of the control commands in the first portion is an allowable control command for each of the data storage entities of the second portion;
providing a user identifier and authentication information to a pass code provider;
authenticating the user identifier using the authentication information;
in response to successfully completing said authenticating, generating, by the pass code provider, a pass code used with issuing control commands to at least a first data storage entity of the second portion, wherein said generating uses one or more criteria to generate the pass code and the one or more criteria includes at least one attribute of the first data storage entity;
sending a request to a data storage system over a control path, the request including the pass code and a control command of the first portion;

performing first processing on the data storage system that validates the pass code for use with the control command; and responsive to successfully validating the pass code, executing the control command.

2. The method of claim 1, wherein the first portion identifies a subset of allowable control commands.

3. The method of claim 2, wherein the second portion identifies a subset of one or more data storage entities defined in a data storage system configuration.

4. The method of claim 3, wherein the second portion identifies a subset of defined logical devices and associated snapshots, and wherein the first portion identifies one or more control commands issued to modify a state associated with any logical device or any snapshot of the second portion.

5. The method of claim 3, wherein the second portion identifies a subset of defined logical devices and associated snapshots, and wherein the first portion identifies one or more control commands issued to delete any logical device or any snapshot of the second portion.

6. The method of claim 1, further comprising:
defining one or more policies each identifying a first subset of control commands;
defining a second subset of data storage system entities; and
associating the second subset of data storage system entities with a first of the one or more policies, wherein said associating indicates that each control command identified in said first policy requires a valid pass code to be provided in order for said each control command to be executed by the data storage system.

7. The method of claim 1, wherein the one or more criteria includes any one or more of: an identifier or serial number of the data storage system, a logical device identifier, a snapshot identifier, a string denoting a date and time, and a network location of the data storage system.

8. The method of claim 7, wherein the first processing performed by the data storage system that validates the pass code comprises:
determining a computed pass code in accordance with the one or more criteria;
comparing the computed pass code to the pass code received over the control path in the request;
if the computed pass code matches the pass code received, determining that the pass code received has been successfully validated; and
if the computed pass code does not match the pass code received, determining that the pass code received has not been successfully validated.

9. The method of claim 1, wherein the authentication information is two-factor authentication information and said authentication performs two-factor authentication processing to authenticate the user identifier.

10. The method of claim 9, wherein the two-factor authentication information includes a user password and a random number generated as part of a random number sequence having a seed value associated with the user identifier.

11. The method of claim 10, wherein a hardware token or fob generates random numbers of the random number sequence at various points in time and displays each of the generated random numbers on the hardware token or fob at a different one of the various points in time.

12. The method of claim 11, wherein the hardware token or fob generates a new random number at each occurrence of a fixed time interval.

13. The method of claim 1, wherein the pass code is valid for any of: performing a specified number of control commands of the first portion, performing any number of control commands of the first portion in a defined time period, and performing any number of control commands before a defined expiration time.

14. The method of claim 1, wherein the pass code is a hash value generated using a cryptographic hash function having one or more inputs determined in accordance with the one or more criteria.

15. A system comprising:
a processor; and
a memory comprising code stored thereon that, when executed, performs a method of processing control commands comprising:
receiving first information identifying a first portion of one or more control commands for a second portion of one or more data storage entities, wherein each of the control commands in the first portion is an allowable control command for each of the data storage entities of the second portion;
providing a user identifier and authentication information to a pass code provider;
authenticating the user identifier using the authentication information;
in response to successfully completing said authenticating, generating, by the pass code provider, a pass code used with issuing control commands to at least a first data storage entity of the second portion, wherein said generating uses one or more criteria to generate the pass code and the one or more criteria includes at least one attribute of the first data storage entity;
sending a request to a data storage system over a control path, the request including the pass code and a control command of the first portion;
performing first processing on the data storage system that validates the pass code for use with the control command; and
responsive to successfully validating the pass code, executing the control command.

16. The system of claim 15, wherein the first portion identifies a subset of allowable control commands.

17. The system of claim 16, wherein the second portion identifies a subset of one or more data storage entities defined in a data storage system configuration.

18. The system of claim 17, wherein the second portion identifies a subset of defined logical devices and associated snapshots, and wherein the first portion identifies one or more control commands issued to modify a state associated with any logical device or any snapshot of the second portion.

19. A non-transitory computer readable medium comprising code stored thereon that, when executed, performs a method of processing control commands comprising: receiving first information identifying a first portion of one or more control commands for a second portion of one or more data storage entities, wherein each of the control commands in the first portion is an allowable control command for each of the data storage entities of the second portion; providing a user identifier and authentication information to a pass code provider; authenticating the user identifier using the authentication information; in response to successfully completing said authenticating, generating, by the pass code provider, a pass code used with issuing control commands to at least a first data storage entity of the second portion, wherein said generating uses one or more criteria to generate the pass code and the one or more criteria includes at least one attribute of the first data storage entity; sending a request to a data storage system over a control path, the request including the pass code and a control command of the first portion; performing first processing on the data storage system that validates the pass code for use with the control command; and responsive to successfully validating the pass code, executing the control command.

* * * * *